US011075936B2

(12) United States Patent
Glenn et al.

(10) Patent No.: US 11,075,936 B2
(45) Date of Patent: *Jul. 27, 2021

(54) GENERATING VULNERABILITY EXPOSURE SCORES IN A SEGMENTED COMPUTING ENVIRONMENT

(71) Applicant: Illumio, Inc., Sunnyvale, CA (US)

(72) Inventors: Matthew Kirby Glenn, Mountain View, CA (US); Paul James Kirner, Palo Alto, CA (US); Seth Bruce Ford, San Francisco, CA (US); Mukesh Gupta, Fremont, CA (US); Joy Anne Scott, Los Altos, CA (US); Nathaniel Jurist Gleicher, Palo Alto, CA (US)

(73) Assignee: Illumio, Inc., Sunnyvale, CA (US)

(*) Notice: Subject to any disclaimer, the term of this patent is extended or adjusted under 35 U.S.C. 154(b) by 115 days.

This patent is subject to a terminal disclaimer.

(21) Appl. No.: 15/902,952

(22) Filed: Feb. 22, 2018

(65) Prior Publication Data

US 2019/0258804 A1 Aug. 22, 2019

(51) Int. Cl.
*H04L 29/06* (2006.01)
*G06F 21/57* (2013.01)
*G06F 9/50* (2006.01)

(52) U.S. Cl.
CPC ........ *H04L 63/1433* (2013.01); *G06F 9/5077* (2013.01); *G06F 21/577* (2013.01); *H04L 63/1425* (2013.01)

(58) Field of Classification Search
CPC . H04L 63/1433; H04L 63/20; H04L 63/1425; G06F 21/577; G06F 21/12; G06F 9/5077
See application file for complete search history.

(56) References Cited

U.S. PATENT DOCUMENTS 9,485,279 B2 11/2016 Kirner et al.
9,787,639 B1 * 10/2017 Sun ..................... H04L 63/0245
(Continued)

FOREIGN PATENT DOCUMENTS

WO WO-2018094516 A1 * 5/2018 ......... H04L 63/0263

OTHER PUBLICATIONS

Francois, Jerome; Lahmadi, Abdelkader; Giannini, Valentin; Cupif, Damien; Beck, Frederic; Wallrich, Bertrand; "Optimizing Internet Scanning for Assessing Industrial Systems Exposure", International Wireless Communications and Mobile Computing Conference (IWCMC), IEEE, Sep. 5-9, 2016, pp. 516-522.*

(Continued)

*Primary Examiner* — Victor Lesniewski
(74) *Attorney, Agent, or Firm* — Fenwick & West LLP

(57) ABSTRACT

A segmentation server generates vulnerability exposure scores associated with workloads operating in a segmented computing environment. The segmentation server may automatically aggregate the vulnerability exposure scores in various ways to generate vulnerability exposure information representative of workloads in an administrative domain controlled by the segmentation server. The aggregated vulnerability exposure information may be presented in a manner that enables an administrator to easily evaluate different segmentation strategies and assess the risks associated with each of them. Moreover, the segmentation server can automatically generate a segmentation policy that modifies a configured segmentation strategy based on the vulnerability exposure scores to reduce exposure to certain vulnerabilities without impeding operation of the workloads.

20 Claims, 9 Drawing Sheets

(56) References Cited

U.S. PATENT DOCUMENTS

| | | | |
|---|---|---|---|
| 9,882,919 B2 | 1/2018 | Kirner et al. | |
| 10,346,076 B1* | 7/2019 | Jonnala | G06F 3/0641 |
| 10,356,128 B1* | 7/2019 | Lango | H04L 67/10 |
| 2007/0011319 A1* | 1/2007 | McClure | H04L 41/12 |
| | | | 709/224 |
| 2007/0169194 A1* | 7/2007 | Church | G06F 21/554 |
| | | | 726/23 |
| 2008/0082380 A1* | 4/2008 | Stephenson | G06F 21/55 |
| | | | 726/25 |
| 2009/0077666 A1* | 3/2009 | Chen | G06Q 10/0631 |
| | | | 726/25 |
| 2013/0167240 A1* | 6/2013 | Kelekar | G06F 9/542 |
| | | | 726/25 |
| 2013/0247207 A1* | 9/2013 | Hugard, IV | H04L 63/1433 |
| | | | 726/25 |
| 2014/0137257 A1* | 5/2014 | Martinez | H04L 63/1433 |
| | | | 726/25 |
| 2014/0222496 A1* | 8/2014 | Flores | G06Q 10/0635 |
| | | | 705/7.28 |
| 2014/0373091 A1 | 12/2014 | Kirner et al. | |
| 2016/0065618 A1* | 3/2016 | Banerjee | H04L 63/20 |
| | | | 726/1 |
| 2018/0062923 A1* | 3/2018 | Katrekar | H04L 41/12 |
| 2018/0063193 A1* | 3/2018 | Chandrashekhar | H04L 61/256 |
| 2018/0115541 A1* | 4/2018 | Styliadis | H04L 63/08 |
| 2018/0219899 A1* | 8/2018 | Joy | G06F 9/5027 |
| 2018/0234459 A1* | 8/2018 | Kung | H04L 63/20 |
| 2019/0020674 A1* | 1/2019 | Vervier | G06F 21/577 |
| 2019/0116199 A1* | 4/2019 | Stopel | H04L 63/308 |
| 2019/0228161 A1* | 7/2019 | Grindstaff, II | G06K 9/6277 |
| 2019/0319926 A1* | 10/2019 | Cummins | H04L 41/02 |

OTHER PUBLICATIONS

Costin, Andrei; "All your cluster-grids are belong to us: Monitoring the (in)security of infrastructure monitoring systems", Conference on Communications and Network Security (CNS), IEEE, Sep. 28-30, 2015, pp. 550-558.*

* cited by examiner

| Tier/Port # | V-E Score |
|---|---|
| Tier T3, Port 80 | 474 |
| Tier T2, Port 44 | 211 |
| Tier T2, Port 80 | 122 |
| Tier T1, Port 44 | 87 |
| Tier T4, Port 453 | 22 |

GENERATING VULNERABILITY EXPOSURE SCORES IN A SEGMENTED COMPUTING ENVIRONMENT

BACKGROUND

Technical Field

This application relates to managing a segmentation policy that controls communications between workloads.

Description of Related Art

A segmentation policy comprises a set of rules that control which workloads may communicate on a network and may place restrictions on how such workloads may communicate. Conventionally, a system administrator may manually configure the segmentation policy by defining individual rules. For a complex network with a large number of workloads, manually configuring the segmentation policy may be a highly burdensome task. As a result, an enterprise may need to devote significant resources to administrating the segmentation policy. Furthermore, an enterprise may face increased security risks if the segmentation policy is not carefully configured.

SUMMARY

A system, non-transitory computer-readable storage medium, and method generates vulnerability information relating to workloads executing on one or more processing devices in a segmented computing environment. A segmentation server obtains a segmentation policy representing permitted connectivity between the workloads. The segmentation server identifies vulnerabilities associated with respective ports of the workloads. The segmentation server determines vulnerability scores associated with each of the identified vulnerabilities for each of the respective ports. The segmentation server determines exposure scores for the respective ports. Here, an exposure score for a particular port represents a measure of exposure of the particular port to other networked devices based on the current segmentation policy. The segmentation server combines the vulnerability scores with the respective exposure scores for the respective ports to generate vulnerability exposure scores for the respective ports. The segmentation server generates a presentation of vulnerability exposure information based on the vulnerability exposure scores. The segmentation server outputs the presentation of the vulnerability exposure information.

In an embodiment, the exposure score can comprise an intra-group exposure score representing a measure of connectivity of the particular port to other workloads within a group associated with a workload of the particular port. In another embodiment, the exposure score can comprise an inter-group exposure score representing a measure of connectivity of the particular port to other workloads outside the group associated with a workload of the particular port. In yet another embodiment, the exposure score can comprise a total exposure score representing a measure of connectivity of the particular port to any other workloads.

In an embodiment, generating the presentation includes the segmentation server aggregating for workloads within a tier, the vulnerability exposure scores for each port number to generate port number scores for each port number. A ranked list of port numbers is generated based on the port number scores.

In an embodiment, generating the presentation includes the segmentation server identifying tiers of workloads in which each of the tiers comprising a group of workloads having common label values across two ore label dimensions. The segmentation server aggregates the vulnerability exposure scores across workloads in each of the tiers to generate tier-level scores for each of the tiers. The segmentation server generates a representation of a tier-level segmentation policy graph comprising nodes representing the tiers and edges representing connectivity between workloads in different ones of the tiers. The segmentation server associates the tier-level scores with corresponding nodes in the tier-level segmentation policy graph.

In an embodiment, the segmentation server determines the exposure scores by generating a count of a number of workloads permitted to connect to a particular port under the current segmentation policy, and generating an exposure score for the particular port based at least in part on the count. The segmentation server may furthermore identify an external network permitted to connect to a particular port under the current segmentation policy, obtain a predefined score associated with the external network, and generate an exposure score for the particular port based in part on the predefined score associated with the external network. The segmentation server may furthermore identify an exposure score for a connecting port permitted to connect to a particular port under the current segmentation policy, and generate the exposure score for the particular port based in part on the exposure score for the connecting port.

In other embodiments, a system, non-transitory computer-readable storage medium, and method generate a modified segmentation policy based on vulnerability information. The segmentation server obtains a current segmentation policy representing permitted connectivity between workloads executing on one or more processing devices in a segmented computing environment. The segmentation server furthermore identifies vulnerabilities associated with respective ports of the workloads. The segmentation server generates vulnerability exposure scores for the ports on the workloads under the current segmentation policy. Here, the vulnerability exposure scores represent a measure of exposure to the vulnerabilities under the current segmentation policy. The segmentation server observes communications between the workloads under the current segmentation policy to generate a traffic flow graph. The segmentation server generates a modified segmentation policy based on the vulnerability exposure scores and the traffic flow graph. The modified segmentation policy reduces exposure to the vulnerabilities relative to the current segmentation policy. The segmentation server generates management instructions based on the modified segmentation policy to enforce the modified segmentation policy. The segmentation server sends the management instructions to operating system instances executing the workloads.

In example embodiment, the segmentation server detects, in a first group of workloads, a vulnerable port on which one of the vulnerabilities exists. The segmentation server detects connectivity using the vulnerable port between the first group of workloads and a second group of workloads in the traffic flow graph. Furthermore, the segmentation server detects a lack of connectivity between the first group of workloads having the vulnerable port and a third group of workloads in the traffic flow graph. In an embodiment, the current segmentation policy permits the connectivity between the first group of workloads and the third group of workloads. The segmentation server generates the modified segmentation policy to limit permitted communications of the first group of workloads to the second group of workloads without permitting communications between the first group of workloads and the third group of workloads.

In another example embodiment, the segmentation server detects, in a first group of workloads, a vulnerable port on which one of the vulnerabilities exists. The segmentation server furthermore detects a lack of connectivity using the vulnerable port between the first group of workloads and a second group of workloads in the traffic flow graph. In an embodiment, the current segmentation policy permits the connectivity using the vulnerable port between the first and second groups of workloads. The segmentation server furthermore detects connectivity using one or more non-vulnerable ports between the first group of workloads and the second group of workloads in the traffic flow graph. The segmentation server generates the modified segmentation policy to limit permitted communications between the first group of workloads and the second group of workloads to using the one or more non-vulnerable ports without permitting communications between the first group of workloads and the second group of workloads using the vulnerable port.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

A segmentation server generates vulnerability exposure scores associated with ports on workloads operating in a segmented computing environment. The vulnerability exposure scores represent the potential exposure of the respective ports to detected vulnerabilities. The segmentation server may automatically aggregate the vulnerability exposure scores in various ways to generate vulnerability exposure information representative of different groups of workloads. The aggregated vulnerability exposure information may be presented in a manner that enables an administrator to easily evaluate different segmentation strategies and assess the risks associated with each of them. Moreover, the segmentation server can automatically generate a recommended segmentation policy according to a desired segmentation strategy. The desired segmentation strategy may be automatically modified based on the vulnerability exposure scores to reduce exposure to certain vulnerabilities without impeding operation of the workloads. As a result, the workloads can operate with improved security relative to conventional computing environments.

Figure 1:
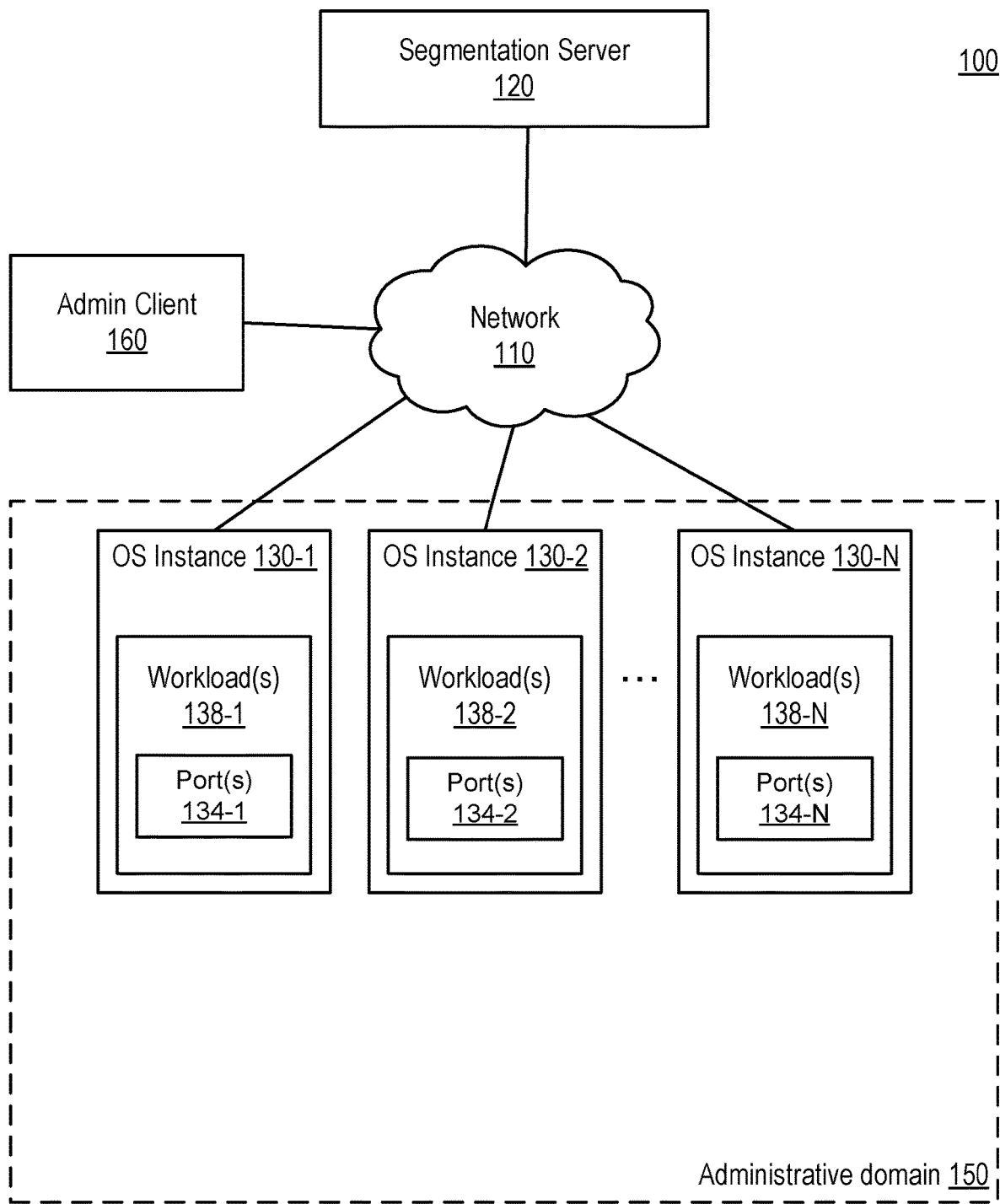
FIG. 1 is a high-level block diagram illustrating an environment for managing a segmentation policy, according to one embodiment.

FIG. 1 is a high-level block diagram illustrating a networked computing environment 100. The networked computing environment 100 includes a segmentation server 120, a network 110, an administrative client 160, and an administrative domain 150 that includes a plurality of operating system (OS) instances 130 (e.g., OS instances 130-1, 130-2, . . . , 130-N). The administrative domain 150 can correspond to an enterprise such as, for example, a service provider, a corporation, a university, or a government agency under control of the segmentation server 120.

The network 110 represents the communication pathways between the segmentation server 120, the administrative client 160, and the OS instances 130. In one embodiment, the network 110 uses standard communications technologies and/or protocols and can include the Internet. In another embodiment, the entities on the network 110 can use custom and/or dedicated data communications technologies.

The OS instances 130 comprise instances of an operating system executing on one or more computing devices. An OS instance 130 may execute directly on a physical machine or on a virtual machine that executes on one or more computing devices. A single physical or virtual machine may operate a single OS instance 130 or may operate multiple OS instances 130 The OS instances 130 each execute one or more workloads 138 (e.g., one or more workloads 138-1, one or more workloads 138-2, etc.). The workloads 138 comprise independently addressable computing units for performing computing tasks. A workload 138 may comprise, for example, an application or application component, a process, a container, or other sub-component thereof executing on the OS instance 130. In some instances, an OS instance 130 may operate only a single workload 138. In other instances, an OS instance 130 may operate multiple workloads 138 that may be independently addressable and may perform different independent computing functions. The workloads 138 on the OS instances 130 may communicate with other workloads 138 on different OS instances 130 within the administrative domain 150 to perform various tasks.

A workload 138 communicates over one or more ports 134. A port 134 comprises a logical communication endpoint for a particular service that is provided by or used by a workload 138. A port 134 on a workload 138 may be identified by a port identifier that may specify, for example, an IP address associated with the workload 138 and a port number. Specific port numbers may be used consistently across different workloads 138 in association with specific services. Thus, the port number can often identify the service and vice versa. For example, port 80 is typically used for hyper-text transfer protocol (HTTP) traffic on any workloads 138 that provide or consume HTTP-based web services and port 5432 is typically used for any TCP traffic associated with PostgreSQL database services. In other instances, the same services on different workloads 138 may utilize different port numbers that are not necessarily consistent, or different services may utilize the same port numbers.

The segmentation server 120 is a computer (or set of computers) that obtains and stores information about the OS instances 130 on the network 120 and the workloads 138 executing on the OS instances 130. The segmentation server 120 manages a segmentation policy for the administrative domain 150 that regulates communications between workloads 138 within the administrative domain 150. In an embodiment, the segmentation policy is set forth using permissive rules that specify the communications that are permitted. The segmentation policy is enforced by blocking any communications that are not expressly permitted by the rules. For example, the segmentation policy includes a set of rules specifying whether certain workloads 138 are allowed to provide services to or receive services from other workloads 138, and may place restrictions on how those workloads 138 are allowed to communicate when providing or consuming the services. For example, a segmentation policy may include a rule specifying that a workload 138-1 operating on an OS instance 130-1 is allowed to provide a particular service to a workload 138-2 operating on an OS instance 130-2. Absent other rules, the workload 138-1 will thus be blocked from providing the service to a workload 138-N operating on an OS instance 130-N. The rule may furthermore specify the type of service that the workload 138-1 is allowed to provide to workload 138-2 (e.g., a database service, a web service, etc.). Additionally, the rule may specify how the workloads 138-1, 138-2 may communicate when providing this service (e.g., using encrypted communication only, using authenticated communication only, etc.). A rule may be specified as a plurality of fields including a "service," a "provided-by" portion that identifies one or more workloads 138 that is permitted to provide the service (which may be specified by a port number), a "used-by" portion that identifies one or more workloads 138 that is permitted to use the service provided by the workloads 138 in the "provided-by portion," and a "rule function" that may place one or more restrictions on the communications between the workloads 138 while facilitating the service.

In an embodiment, the segmentation server 120 may assign one or more labels to each workload 138 that define one or more high-level characteristics of the workload 138. Labels may be multi-dimensional. Here, a label may comprise a "dimension" (a high-level characteristic) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe." Workloads 138 may also be labeled based on a user group of a user that is logged into the workload 138 or the corresponding OS instance 130 on which the workload 138 executes. For example, a workload 138 may have a label with a dimension "user group" and a value "managers." Each workload 138 may be assigned labels for one or more dimensions but each workload 138 does not necessarily have a label assigned for every possible dimension. For example, a workload 138 may have a label specifying its location but may not necessarily have a label specifying its role. The set of labels assigned to a particular workload 138 may be referred to herein as a label set for the workload 138.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
|---|---|
| Role | M: The role of the managed server within the administrative domain.<br>V: web, API, database |
| Environment | M: The lifecycle stage of the managed server.<br>V: production, staging, development |
| Application | M: The logical application (higher-level grouping of managed servers) to which the managed server belongs.<br>V: trading, human resources |
| Line of Business | M: The business unit to which the managed server belongs.<br>V: marketing, engineering |
| Location | M: The location of the managed server. Can be physical (e.g., country or geographical region) or logical (e.g., network). Physical is particularly useful for expressing geographic compliance requirements.<br>V: US or EU (physical), us-west-1 or us-east-2 (logical) |
| User Group | M: The user group containing the user logged onto the managed server.<br>V: Engineers, Contractors, Managers, System Administrators |

Workloads 138 may be logically grouped based on their respective label sets. An "application group" may be defined as a group of workloads 138 having the same label values for a predefined subset of label dimensions without necessarily having the same values in the other dimensions. For example, in one embodiment, an application group could be defined to include all workloads having the same label values in each of the "environment" and "application" dimensions. Alternatively, an application group could be defined to include all workloads having the same label values in each of the "environment," "application" and "location" dimensions. A "tier" may be defined as a group of workloads 138 within an application group that have the same label value for at least one additional label dimension distinct from the label dimensions defining the application group. For example, a tier may be defined as group of workloads 138 having the same label values for the "environment," "application," and "role" labels. Alternatively, a "tier" may be defined as a group of workloads 138 having the same label values for the "environment," "application," "role," and "location" dimensions. In some embodiments, the specific label dimensions used to define an application group and a tier may be configurable by an administrator.

The segmentation server 120 may utilize label sets to enable the segmentation policy to be defined at a high level of abstraction by specifying rules based on label sets. Thus, a rule of the segmentation policy may identify a group of workloads 138 to which a portion of the rule is applicable by referencing one or more label sets. For example, a rule may specify that a first group of workloads 138 with a label set A may provide a service B to a second group of workloads 138 with a label set C. Rules may be specified for groups of workloads 138 identified using only a subset of the label dimensions. For example, the segmentation policy may specify rules that control communications between specified application groups or between specified tiers.

The segmentation server 120 may retain a repository storing information about the OS instances 130 and the workloads 138 managed by the segmentation server 120. For example, the segmentation server 120 may store, for each OS instance 130, an OS instance identifier that uniquely identifies the OS instance 130, workload identifiers for workloads 138 associated with the OS instance 138, and membership information indicating one or more groups of workloads 138 to which each workload 138 belong (e.g., as defined by the respective label sets for the workloads 138).

Table 2 illustrates an example of information stored by the segmentation server 120. Here, the "ID" represents the OS instance identifier for each OS instance 130. The workload ID(s) represent the workload identifier for the workload(s) 138 executing on each OS instance 130. If only a single workload executes on a particular OS instance 130, the workload ID may be synonymous with the OS instance ID (e.g., in the case of ID1 and IDn). If more than one workload 138 executes on a given OS instance 130, the workload ID may include the OS instance ID in combination with a sub-identifier for the workload 138 (e.g., in the case of ID2). The sub-identifier may comprise, for example, an IP address or other identifier that uniquely identifies the workload 138 when taken in combination with the identifier for the OS instance 130. The memberships represent groups to which one or more workloads 138 executing on the OS instance 130 belongs. Each group may correspond to a unique label set involving one or more dimensions (e.g., a combination of labels representing an application group, tier, or other group).

TABLE 2

Example of a Repository Table

| OS Instance ID | Workload ID(s) | Memberships |
|---|---|---|
| ID1 | ID1 | A, C, D |
| ID2 | ID2 + subID1 | B, C |
|  | ID2 + subID2 | D |
| . | . | . |
| . | . | . |
| . | . | . |
| IDn | IDn | B, D, E, F |

Instead of enforcing the segmentation policy at a centralized device, the segmentation policy is instead enforced by at least a subset of the OS instances 130. To enable enforcement of the segmentation policy, the segmentation server 120 generates a set of management instructions and distributes the management instructions to the OS instances 130. The management instructions include the rules controlling communications between different groups of workloads 138 (e.g., specified by their label sets or directly by an identifier of the workload 138) and membership information indicating workloads 138 belonging to each group (e.g., which workloads 138 have certain label sets). For efficiency of distribution, the segmentation server 120 may send different management instructions to different OS instances 130 so that each OS instance 130 gets only the management instructions relevant to its operation. Here, the segmentation server 120 may determine which rules are relevant to a given OS instance 130 and distribute the relevant rules to that OS instance 130. A rule may be deemed relevant to a particular OS instance 130 if that OS instance 130 executes one or more workloads 138 that belongs to a group (defined by one or more label sets) referenced by the rule. The segmentation server 120 may furthermore determine which membership information is relevant to each OS instance 130 and distribute the relevant membership information to each respective OS instance 130. Here, membership information may be relevant to a particular OS instance 130 if it defines membership of a group referenced by a rule deemed relevant to the particular OS instance 130. Further details of a segmentation system for controlling communications between OS instances 130 based on labels is described in U.S. Patent Application Publication No. 2014/0373091 entitled "Distributed Network Security Using a Logical Multi-Dimensional Label-Based Policy Model," to Paul J. Kirner, et al., which is incorporated by reference herein.

The administrative client 160 comprises a computing device that may be operated by an administrator of the administrative domain 150 being managed by the segmentation server 120. The administrative client 160 may execute an interface (e.g., via an application or web browser) that enables the administrator to interact with the segmentation server 120 to configure or view the segmentation policy. The interface may furthermore enable the administrator to obtain various information about the OS instances 130 and workloads 138 on the network 120 and view traffic flows between the workloads 138.

Figure 2:
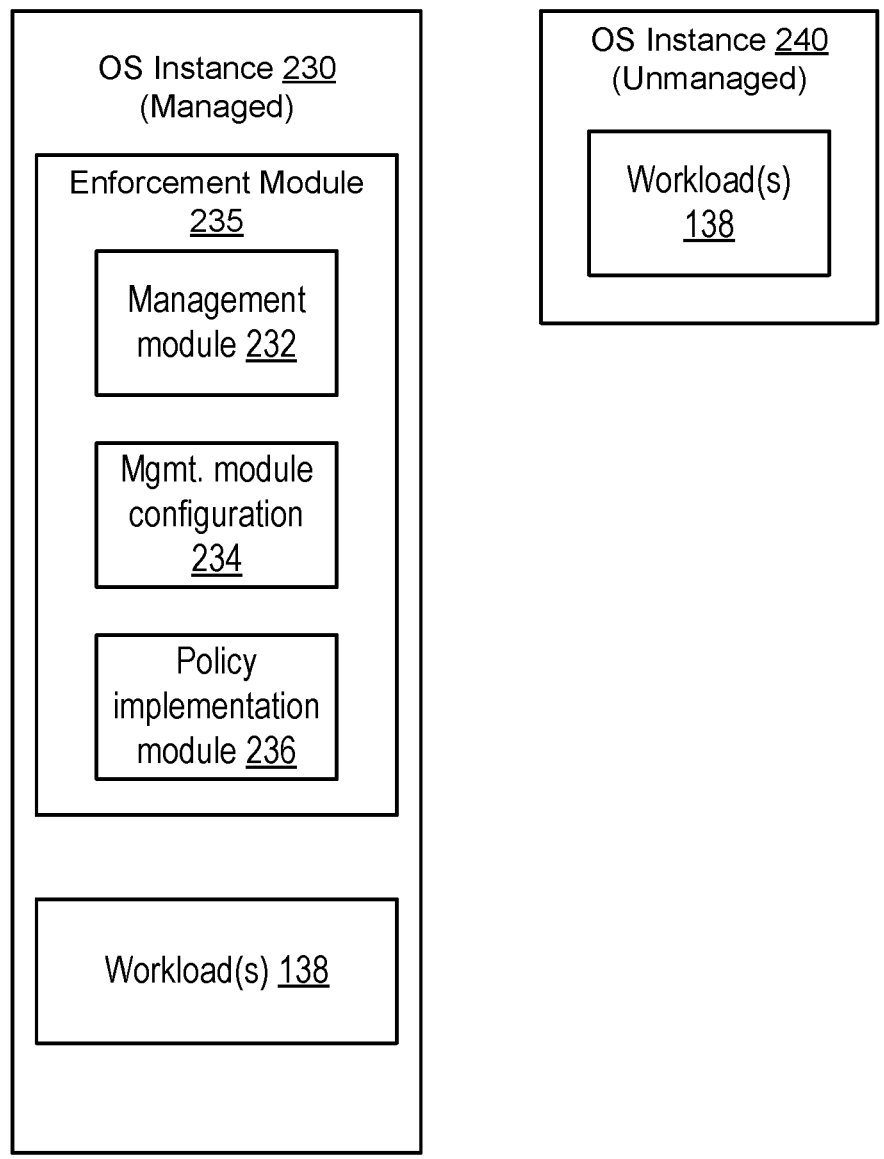
FIG. 2 is a block diagram illustrating example embodiments of operating system instances.

FIG. 2 illustrates example embodiments of OS instances 130. An OS instance 130 may correspond to a managed OS instance 230 or an unmanaged OS instance 240. A managed OS instance 230 includes an enforcement modules 235 that enables the managed OS instance 230 to enforce the segmentation policy for the workloads 138 it executes. In contrast, the unmanaged OS instance 235 does not include an enforcement module 235 and is unable to directly contribute to enforcement of the segmentation policy. The segmentation server 120 thus only distributes management instructions to the managed OS instances 230. Nevertheless, the unmanaged OS instances 240 may still be affected by the segmentation policy because the managed OS instances 230 may limit communications of its workloads 138 with workloads 138 on the unmanaged OS instance 240. Workloads 138 executing on the unmanaged OS instances 240 may be assigned labels and may be referenced in the rules of the segmentation policy in the same way as workloads 138 on managed OS instances 130. Thus, communications between workloads 138 on managed OS instances 230 and unmanaged OS instances 240 may be controlled by the segmentation policy by enforcing the rules at the managed OS instances 230.

In some embodiments, the segmentation policy may be effectively enforced on an unmanaged OS instance 240 by a separate device that can control communications to and from the unmanaged OS instance 240 on which workloads 138 execute. For example, an enforcement module 235 on an upstream switch port or other device may control communications to and from workloads 138 on a downstream unmanaged OS instance 240. In this case, the segmentation policy can be enforced directly on the workloads 138 on an unmanaged OS instance 240 similarly to enforcement on a managed OS instance 230.

The enforcement module 235 includes a management module 232, a management module configuration 234, and a policy implementation module 236. The management module 232 comprises a low-level network or security engine that controls incoming and outgoing traffic associated with each of the workloads 138 executing on the OS instance 130. For example, the management module 232 may include an operating system-level firewall, an Internet Protocol security (IPsec) engine, or a network traffic filtering engine (e.g., based on the Windows Filtering Platform (WFP) development platform). The management module 132 on a given managed OS instance 230 restricts communications to or from the workloads 138 executing on the given managed OS instances 230 based on the management module configuration 134. For example, the management module 232 may permit a particular workload 138 to communicate with a limited set of workloads 138 on other OS instances 130, and may block all other communications. Furthermore, the management module 232 may place restrictions on how each workload 138 is permitted to communicate. For example, for a particular workload 138, the management module 232 may enable the workload 138 to communicate using only encrypted protocols and block any unencrypted communications.

The policy implementation module 236 receives the management instructions from the segmentation server 120 and translates the management instructions from a high level of abstraction to a low level of abstraction represented by the management module configuration 234. For example, the policy implementation module 236 may obtain the relevant rules and relevant membership information from the management instructions, and identify the specific workloads 138 and services controlled by the rules. The policy implementation module 236 then generates a management module configuration 234 that enables the management module 232 to enforce the management instructions.

Figure 3:
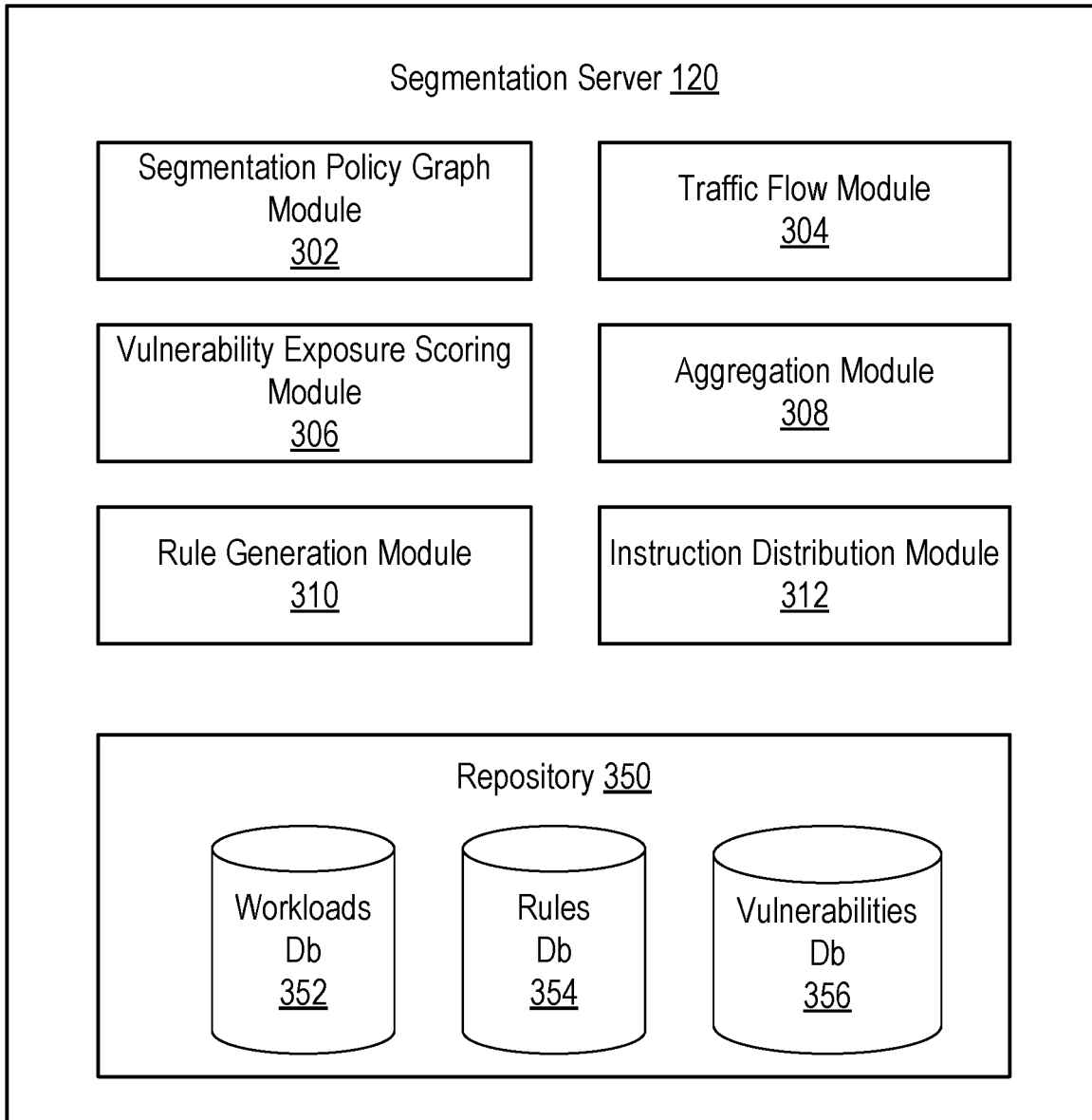
FIG. 3 is a block diagram illustrating an example embodiment of a segmentation server.

FIG. 3 is a high-level block diagram of an embodiment of a segmentation server 120. The segmentation server 120 comprises a segmentation graph module 302, a traffic flow module 304, a vulnerability exposure scoring module 306, an aggregation module 308, a rule generation module 310, an instruction distribution module 312, and a repository 350. The repository 350 may comprise a workloads database 352 that stores associations between workloads 138 and their respective label sets, a rule database that stores a segmentation policy as a set of rules, and a vulnerabilities database 356 that stores information relating to detected vulnerabilities associated with workloads 138 in the administrative domain 150. In alternative embodiments, the segmentation server 120 may include different or additional components. The various components of the segmentation server 120 may be implemented as one or more processors and a non-transitory computer-readable storage medium that stores instructions executed by the one or more processors to carry out the functions attributed to the segmentation server 120 described herein.

The segmentation policy graph module 302 generates a segmentation policy graph comprising a data structure representing the permitted (but not necessarily observed) connections between workloads 138 under the segmentation policy. In the segmentation policy graph, each workload 138 is represented by a node and permitted connections between workloads 138 are represented by edges between the respective nodes. The nodes may store information relating to the workloads 138 and the edges may store information relating to the permitted traffic between the workloads such as the permitted port numbers, protocols, and services permitted between the workloads 138.

The segmentation policy graph module 302 may generate a segmentation policy graph that is limited to workloads within the scope of a specified label set. For example, the segmentation policy graph module 302 may generate a segmentation policy graph for a specific application group that is limited to rules affecting workloads 138 in the application group or may generate a segmentation policy graph for a specific tier that is limited to rules affecting workloads 138 within the specified tier.

The segmentation policy graph module 302 may furthermore generate segmentation policy graphs at different levels of abstraction. For example, the segmentation policy graph module 302 may generate a tier-level segmentation policy graph in which tiers of workloads 138 are represented as nodes and a permitted connection between one or more pairs of workloads 138 in different tiers are represented as edges between the nodes. In this representation, an edge exists between a first tier and a second tier if a rule permits a connection between any workload 138 in the first tier and any workload 138 in the second tier. Similarly, the segmentation policy graph module 308 may generate an application-level segmentation policy graph in which application groups are represented as nodes and a permitted connection between one or more pairs of workloads 138 in different application groups are represented as edges between the nodes. In this representation, an edge exists between a first application group and a second application group if a rule permits a connection between any workload 138 in the first application group and any workload 138 in the second application group.

The traffic flow module 304 monitors traffic between workloads 138 and presents information relating to the traffic flows. For example, the traffic flow module 304 may identify each pair of workloads 138 that communicate with each other during a particular time period. For each detected traffic flow between a pair of workloads 138, the traffic flow module 304 may identify what services are communicated between the pair of workloads 138 and the corresponding ports 134 and protocols used in the communications. Furthermore, the traffic flow module 304 may identify statistical information relating to the traffic flow between a pair of workloads 138 such as, for example, a volume of data transferred between the pair of workloads within a particular time period, a frequency of communications between the pair of workloads 138, a duration of communications between the pair of workloads 138, or other statistical information indicative of the extent of the communications. For the purpose of monitoring the traffic flows, the traffic flow module 304 may operate under a very permissive segmentation policy (e.g., enabling all workloads 138 in the administrative to communicate with all workloads 138 over all ports and protocols) so that the traffic flows are representative of the normal operation of the workloads 138 in the administrative domain 150.

The traffic flow module 304 may generate a data structure representing the traffic flows in the form of a traffic flow graph in which each workload 138 is represented by a node and a traffic flow between a pair of workloads 138 is represented by an edge connecting the respective nodes corresponding to the connected pair of workloads 138. The nodes may store information relating to the workloads 138 and the edges may store information relating to the traffic flow such as the port number, service, process, protocol, or combination thereof associated with the traffic flow. In an embodiment, the traffic flow graph may be limited to traffic flows meeting predefined criteria. For example, the traffic flow graph may be limited to traffic flows meeting a predefined threshold volume of the traffic (e.g., amount of data, frequency, duration, or a combination thereof). Thus, pairs of workloads 138 having only very limited or sporadic communications may be omitted from the traffic flow graph.

The traffic flow module 304 may generate a traffic flow graph that is limited to workloads within the scope of a specified label set. For example, the traffic flow module 304 may generate a traffic flow graph for a specific application group that is limited to traffic flows involving workloads 138 in the application group. In another example, the traffic flow module 304 may generate a traffic flow graph for a specific tier that is limited to traffic flows involving workloads 138 within the specified tier.

The traffic flow module 304 may furthermore generate traffic flow graphs at different levels of abstraction. For example, the traffic flow module 304 may generate a tier-level traffic flow graph in which tiers of workloads 138 are represented as nodes and an observed connection between one or more pairs of workloads 138 in different tiers are represented as edges between the nodes. In this representation, a first tier is considered connected to a second tier if a traffic flow is observed between any workload 138 in the first tier and any workload 138 in the second tier. Similarly, the traffic flow module 304 may generate an application-level traffic flow graph in which application groups are represented as nodes and an observed connection between one or more pairs of workloads 138 in different application groups are represented as edges between the nodes. In this representation, a first application group is considered "connected" to a second application group if a traffic flow is observed between any workload 138 in the first application group and any workload 138 in the second application group.

The edges in a traffic flow graph and a segmentation policy graph may overlap to varying degree depending on how permissive the segmentation policy. For example, in a highly permissive segmentation policy, the number of edges in the segmentation policy graph may be significantly more than the number of edges in the traffic flow graph because only a subset of the permitted connections are actually utilized by the workloads 138. In a less permissive segmentation policy, the number of edges in the segmentation policy graph may be similar to or the same as the number of edges in the traffic flow graph because the segmentation policy only permits traffic close to that observed.

The vulnerability exposure scoring module 306 generates vulnerability exposure scores associated with ports 134 of the workloads 138 in the administrative domain 150. A vulnerability exposure score for a particular port 134 represents a measure of risk associated with a connection to the particular port 134.

In an embodiment, a vulnerability exposure score for a particular port 134 may be generated based on one or more vulnerability scores of vulnerabilities associated with the particular port 134 and an exposure score representing a connectivity measure of the particular port 134. The vulnerability exposure scoring module 306 may obtain vulnerability scores that identify vulnerabilities present on workloads 138 in the administrative domain 150 and provides scores associated with the identified vulnerabilities. For example, in an embodiment a vulnerability scanner executing on each workload 138 may scan the workload 138 for certain predefined characteristics defined in a list of known vulnerabilities and report detected vulnerabilities to the vulnerability exposure scoring module 306 (e.g., using a vulnerability identifier uniquely associated with the detected type of vulnerability). The vulnerability exposure scoring module 306 may then map the detected vulnerability to a score according to a predefined mapping. For example, in one embodiment, the vulnerability exposure scoring module 306 may utilize a Common Vulnerability Scoring System (CVSS) to generate the vulnerability scores. Particularly, an embodiment may utilize an Attack Vector (AV) metric in determining the vulnerability scores. In other embodiments, the vulnerability exposure scoring module 306 may obtain vulnerabilities and associated scores from a vulnerability scanner that executes externally to the workloads 138 (e.g., on a separate scanning server) to scan the workloads 138 and report the results of the scan to the vulnerability exposure scoring module 306.

The vulnerability exposure scoring module 306 may obtain detection results for multiple different vulnerabilities on the same workload 138. Furthermore, the same type of vulnerability (e.g., having the same vulnerability identifier) may be found on multiple different workloads. The scanning results may be stored to a table in the vulnerabilities database 356 with each entry in the table specifying (1) an identifier for the type of vulnerability found, (2) a port identifier associated with the vulnerability (e.g., identified by a workload identifier such as an IP address and a port number), and (3) a vulnerability score associated with the vulnerability. An example of a vulnerability table is provided in Table 3 below:

TABLE 3

| Port Identifier<br>[Workload ID (IP Address):<br>Port Number] | Vulnerability ID | Vulnerability<br>Score |
|---|---|---|
| 100.100.1.1: 80 | V1 | 8 |
| 100.100.1.2: 35 | V2 | 4 |
| 100.100.1.3: 80 | V1 | 8 |
| 100.100.1.4: 44 | V3 | 3 |

The vulnerability exposure scoring module 306 also generates exposure scores for each port 134 based on the permitted connectivity of the port 134 under a particular segmentation policy. For example, in one embodiment, the exposure score for a particular port 134 is based on a count of the number of workloads 138 that can connect to the particular port 134 under the segmentation policy (i.e. the number of edges connected to the workload 138 using the particular port 134 in the segmentation policy graph). The exposure score for a particular port 134 may furthermore be based on permitted connectivity of the port 134 to external networks outside of the administrative domain 150 controlled by the segmentation policy. For example, if the segmentation policy permits a particular port 134 to connect to an external network with a known number of external workloads, a count of the known number of external workloads and a risk factor associated with the external network may contribute to the exposure score to represent the exposure of the port 134 to the external network. If the segmentation policy permits a particular port 134 to connect to an external network with an unknown number of external workloads, a predefined estimated count and risk factor may contribute to the exposure score to represent an estimated exposure of the port 134 based on its connection to the external network. If the external network has a very large number of workloads and/or the external network has a high risk factor (e.g., the external network is the Internet), then the exposure score for the port 134 may be set to a predefined maximum value.

In another embodiment, the exposure score for a particular port 134 may be based on a combination of a direct exposure component representing an estimated count of the workloads 138 permitted to connect with the particular port 134 under the segmentation policy, and an indirect exposure component representing a combination of the respective exposure scores of the other ports 134 permitted to directly connect to the particular port 134. Here, the exposure scores may be generated according to an iterative process. For example, in a first iteration, the direct exposure component may initially be computed for each port 134 and the indirect exposure components may be initialized to zero. Then, in a second iteration, the exposure score for particular port 134 may be computed as a weighted combination of its direct exposure score and the exposure scores associated with each other port 134 permitted to connect to the particular port 134. This process may be repeated until a stopping criterion is reached (e.g., a predefined number of iterations).

In an embodiment, the vulnerability exposure scoring module 306 may generate exposure scores for a particular port according to different parameters. For example, an intra-group exposure score may be computed for a particular port on a particular workload that represents a measure of connectivity of the particular port to other workloads within a limited group of workloads to which the particular workload belongs (e.g., a tier or an application group associated with the particular workload). An inter-group exposure score may be computed for a particular port on a particular workload that represents a measure of connectivity of the particular port to other workloads outside of a limited group of workloads to which the particular workload belongs (e.g., a tier or an application group associated with the particular workload). A total exposure score may be computed for a particular port on a particular workload that represents a measure of connectivity associated with all connections of the particular port to other workloads (e.g., representing a sum of the intra-group exposure score and the inter-group exposure score). In an embodiment, inter-group and intra-group exposure scores may be computed with respect to multiple different groups to generate a set of exposure scores associated with a particular port. For example, for each port, a set of exposure scores may be generated including, for example, (1) an intra-group exposure scores at the tier level; (2) an inter-group exposure score at the tier level; (3) an intra-group exposure score at the application level; (4) an inter-group exposure score at the application level; and (5) a total exposure score.

The vulnerability exposure module 306 combines the vulnerability scores associated with each port 134 and the exposure score for each port 134 to generate respective vulnerability exposure scores for each port 134. For example, in one embodiment, the vulnerability exposure score for a particular port 134 is computed as a product of a function of the exposure score for the particular port 134 and a function of the vulnerability score for the port 134. For example, in one embodiment, the vulnerability exposure score for a particular port 134 can be computed as:

$$VE_P = \sqrt{E_P} \cdot V_P^3$$

where E represents the exposure score for a port P (computed according to any of the methods above), V represents the vulnerability score for the port P, and $VE_P$ represents the vulnerability exposure score for the port P.

The vulnerability exposure scoring module 306 may generate different types of vulnerability exposure scores for a particular port depending on the type of exposure score. For example, an intra-group vulnerability exposure score may be computed for a particular port on a particular workload that represents a measure of risk associated with to connections of the particular port to other workloads within a limited group of workloads in which the particular workload belongs (e.g., a tier or an application group associated with the particular workload). An inter-group vulnerability exposure score may be computed for a particular port on a particular workload that represents a measure of risk associated with connections of the particular port to other workloads outside of a limited group of workloads to which the particular workload belongs (e.g., a tier or an application group associated with the particular workload). A total vulnerability exposure score may be computed for a particular port on a particular workload that represents a measure of risk associated with all connections of the particular port to other workloads (e.g., representing a sum of the intra-group vulnerability exposure score and the inter-group vulnerability exposure score). In an embodiment, inter-group and intra-group vulnerability exposure scores may be computed with respect to multiple different groups to generate a set of exposure scores associated with a particular port. For example, for each port, a set of vulnerability exposure scores may be generated including, for example, (1) an intra-group vulnerability exposure scores at the tier level; (2) an inter-group vulnerability exposure score at the tier level; (3) an intra-group vulnerability exposure score at the application level; (4) an inter-group vulnerability exposure score at the application level; and (5) a total vulnerability exposure score.

The exposure score(s), vulnerability score, and vulnerability exposure score(s) for each port 134 may be stored in a table in the vulnerabilities database 356 as illustrated in the example of Table 4:

TABLE 4

| Port Identifier [Workload ID (IP Address): Port Number] | Exposure Score | Vulnerability Score | Vulnerability Exposure Score |
|---|---|---|---|
| 100.100.1.1: 80 | 25 | 12 | 8,640 |
| 100.100.1.2: 35 | 144 | 4 | 768 |
| 100.100.1.3: 80 | 400 | 8 | 10,240 |
| 100.100.1.4: 44 | 10000 (Max) | 3 | 2,700 |

For simplicity, Table 4 illustrates a single exposure score and single vulnerability exposure score for each port 134. As described above, multiple exposure scores and multiple corresponding vulnerability exposure scores may be computed for each port computing according to different parameters.

An aggregation module 308 may aggregate data in the vulnerability exposure score table to generate various aggregate data that can be useful to analyze a particular segmentation policy. For example, in one embodiment, the aggregation module 308 may generate port number scores associated with each port number provided by workloads 138 in a particular group (e.g., a tier or application group). Here, the port number score for a particular port number is derived from the vulnerability exposure scores for a particular port number associated with the particular service on all workloads within the group providing the service (e.g., all vulnerability exposure scores associated with port 80 for the workloads within a tier). For example, the port number score may be based on a sum, an average, or a maximum of the vulnerability exposures scores for the port numbers on all workloads 138 within the group. Here, the vulnerability exposure scores used to calculate the port number scores may be inter-group vulnerability exposure scores, intra-group vulnerability exposure scores, total vulnerability exposure scores, or a combination thereof. In one particular example, the aggregation module 308 may generate a list of the services provided by each tier within an application group ranked by their respective port-number scores. This aggregation lets an administrator easily identify which port numbers provide the greatest risk to an administrative domain.

The aggregation module 308 may also generate group scores associated with a particular group of workloads 138 such as a tier or application group. Here, the group score for a particular group is derived from the vulnerability exposure scores for all ports 134 on workloads 138 within the particular group. For example, the group score may be based on a sum, an average, a maximum, or another function of the total vulnerability exposures scores for the ports 134 on workloads 138 within the particular group. In another example, the group score may be based on a sum, an average, a maximum, or another function of only the inter-group vulnerability exposure scores for the ports 134 on workloads 138 within the group. In the latter example, the group scores represent a risk associated with connections to workloads 138 outside the group without taking into account the risks associated with connections within the group. These scores may be useful to enable an administrator to easily identify which inter-group connections (e.g., connections between tiers or application groups) provide the greatest risk to an administrative domain.

Figure 4:
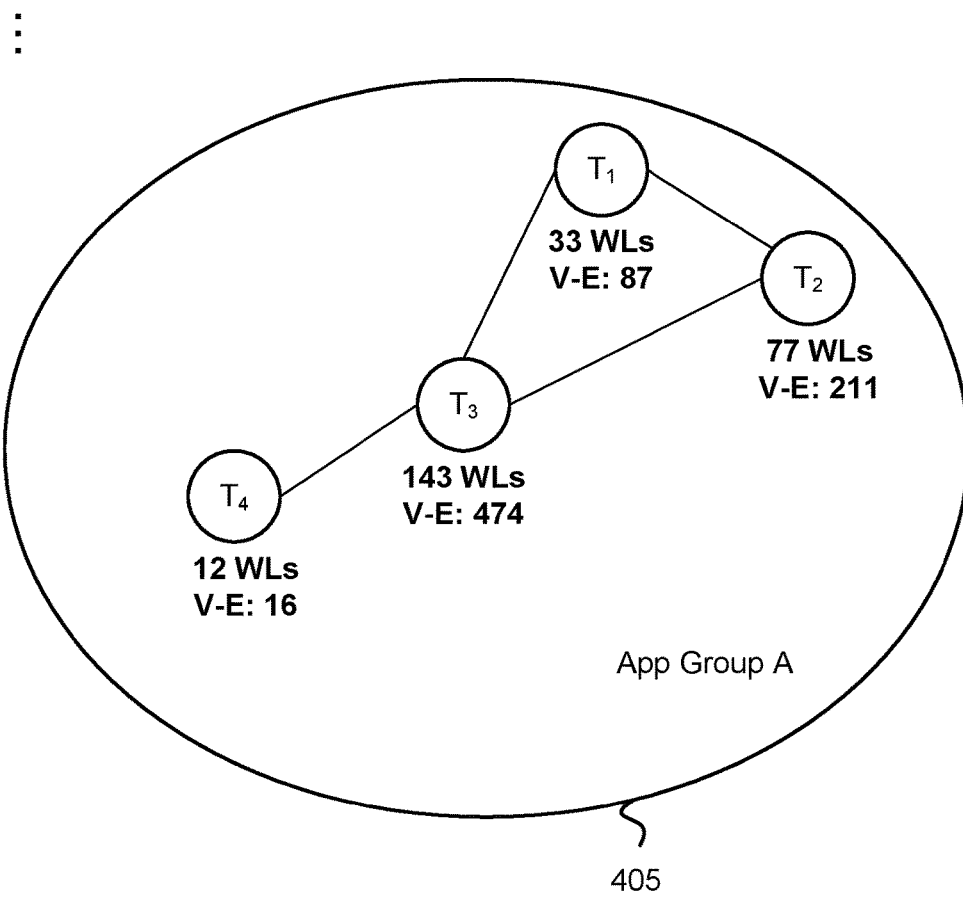
FIG. 4 is a diagram illustrating an example presentation of vulnerability exposure information associated with workloads in a segmented computing environment.

In an embodiment, the aggregation module 308 may generate a visualization of one or more segmentation policy graphs together with various aggregated vulnerability data to provide an administrator with a convenient visualization of the vulnerabilities associated with a particular segmentation strategy. FIG. 4 illustrates a simple example of a graphical representation of the vulnerability information. In this example, a tier-level segmentation policy graph 405 is illustrated for an application group A having tiers $T_1$, $T_2$, $T_3$ and $T_4$. Each of the tiers are displayed together with an indication of the number of workloads 138 in each tier ("WLs") and a group score ("V-E") for the respective tier, which may be computed according to any of the techniques described above. The aggregation module 308 may furthermore generate a table 410 showing a ranked list of port numbers sorted by their respective port number scores (e.g., from highest to lowest) for the tiers and port numbers in the application group A, which may be computed according to any of the techniques described above Referring again to FIG. 3, the rule generation module 310 automatically generates or updates a segmentation policy comprising a set of rules. The particular strategy for generating the rules may be based on configuration settings, the observed traffic graph, the vulnerability exposure scores, or a combination thereof. In general, the rule generation module 310 generates rules that when enforced will allow at least the traffic flows in the traffic flow graph. The rules may also allow traffic flow beyond that specifically observed in the traffic flow graph depending on the level of permissiveness specified in the configuration settings and dependent on the identified vulnerability exposure scores. For example, the rule generation module 310 may generate the most permissive rules allowed by the configuration settings that do not unnecessarily expose an identified vulnerability. Generating rules based on the observed traffic flow graph is beneficial because, assuming that there are no abnormal or malicious communications in the administrative domain 150 in the observed traffic flow graph, the rule generation module 310 can produce a set of rules that permits communications observed during normal operation of the workloads 138 in the administrative domain 150 while blocking or limiting abnormal communications that are potentially malicious. Furthermore, by limiting rules based on the discovered vulnerabilities, the rule generation module 310 may reduce the exposure to a known vulnerability by limiting overly permissive rules. Embodiments of processes for generating rules are further described in U.S. Pat. No. 9,485,279 issued on Nov. 1, 2016 to Paul J. Kirner, et al., which is incorporated by reference herein.

The rule generation module 310 may generate rules based on different segmentation strategies depending on configuration parameters. For example, under a port-level granularity segmentation strategy, the rule generation module 310 generates a set of rules that only permits communications between pairs of workloads 138 using the specific ports and protocols observed in the traffic flows. Thus, for example, if the traffic flow module 304 only observes communications between a first workload $W_1$ and a second workload $W_2$ using port P, a rule will be generated that permits communications between the first workload $W_1$ and the second workload $W_2$ only over port P without permitting communications over other ports. In an embodiment, the generated rule may be specified to apply to particular groups of workloads 138 in which the respective workloads in the pair have memberships. For example, the rule may specified in accordance with respective label sets of the pair of workloads along a predefined set of dimensions (e.g., the dimensions defining a tier). As a result, the rule will also permit communications conforming to the specified ports and protocols between different pairs of workloads that conform to the same respective label sets along the same predefined set of dimensions (e.g., the same respective tiers) as the observed pair of workloads. For example, a rule may be generated that permits workloads 138 in a first tier associated with the label set "App: Point of Sale; Environment: PCI; Role: Database" to provide a service on port 5432 using TCP protocol to workloads 138 in a second tier associated with the label set "App: Point of Sale: Environment: PCI; Role: Processing."

In a workload-level granularity segmentation strategy, the rule generation module 310 generates rules that enable communications between groups of workloads 138 that are observed as being connected in the traffic flow graph, without limiting the rules to specific ports or protocols. For example, if a connection is observed between a workload 138 in a first group of workloads 138 and a workload 138 in a second group of workloads 138, a rule is generated to permit communications between workloads 138 in the first group and workloads in the second group. Here, the group to which the rule generating applies may be preconfigured and may be based on a label set along a predefined set of dimensions. For example, under one configuration, this strategy may generate a rule may that permits workloads 138 in a first tier associated with the label set "App: Point of Sale; Environment: PCI; Role: Database" to provide any service (using any port and any protocol) to workloads 138 in a second tier associated with the label set "App: Point of Sale: Environment: PCI; Role: Processing" if any traffic flows are observed between the first and second tier in the traffic flow graph. Upon enforcement of the segmentation policy, communications between pairs of workloads that are not expressly permitted by the rules will be blocked.

Under other configuration settings, the rule generation module 310 may generate rules that permit communications between certain specified groups of workloads 138 (e.g., based on the label sets) independently of the observed traffic flows. For example, in a group-level granularity segmentation strategy, the rule generation module 310 generates a set of rules that permits communications between all workloads 135 in a predefined group (e.g., share a set of labels along a predefined set of dimensions) without regard to observed communications. For example, the rule generation module 310 may generate rules that permit communications between all workloads 138 within the same application group. For example, a rule may be generated that permits workloads 138 in an application group associated with the label set "App: Point of Sale; Environment: PCI" to provide any service (using any port and any protocol) to other workloads 138 in the application group. Upon enforcement of the segmentation policy, communications between pairs of workloads that are not expressly permitted by the rules will be blocked.

In another embodiment, configuration settings may cause the rule generation module 310 to generate rules permitting communications between specified groups of workloads 138. For example, under certain configuration settings, the rule generation module 310 may generate rules permitting communications between a first application group $A_1$ and a second application group $A_2$.

In an embodiment, rules may be generated differently for different groups of workloads 138 by specifying different configuration settings for different groups. For example, rules may be generated for workloads 138 in a first application group according to a workload-level granularity segmentation strategy while rules may be generated for workloads 138 in a second application group according to a port-level granularity segmentation strategy. Furthermore, rules controlling communications between different groups of workloads 138 may be generated according to different configuration settings. For example, rules controlling communications between workloads 138 in a first application group and workloads 138 in a second application group may be generated according to a workload-level granularity segmentation strategy while rules controlling communications between workloads 138 in a first application group and workloads 138 in a third application group may be generated according to a group-level granularity segmentation strategy.

In other embodiments, a segmentation strategy may be applied to generate rules in which workloads 138 are permitted to provide services according to a first segmentation strategy and are permitted to use services according to second segmentation strategy. For example, a segmentation strategy may generate rules that enable workloads 138 to provide services to any workloads 138 within an application group without regard to specific port or protocol (e.g., consistent with a group-level granularity segmentation strategy), but only enables workloads 138 to use services consistent with the ports and protocols in the observed traffic graph (consistent with a port-level granularity segmentation strategy).

In yet other embodiments, other variations of segmentation strategies or combinations thereof may be applied that do not necessarily conform to the port-level granularity, workload-level granularity, or group-level granularity strategies described above or the variations thereof discussed above.

The rule generation module 310 may modify an initial segmentation strategy based on the vulnerability exposure scores to reduce the number of permitted connections that may expose the administrative domain 150 to a vulnerability. Here, the rule generation module 310 identifies vulnerable ports that have vulnerability exposure scores exceeding a predefined threshold score. If a resulting segmentation policy enables communication over a vulnerable port, the segmentation strategy may be modified so that the resulting segmentation policy limits the permitted communications on the vulnerable port based on the observed traffic flow graph, as will be described in further detail below with reference to FIGS. 5-6. The vulnerability exposure scores may then be updated based on the modified segmentation strategy to enable an administrator to compare the different segmentation options.

The instruction distribution module 312 generates the management instructions from the rules for a current segmentation policy and distributes the relevant management instructions to the OS instances 130 as described above. In an embodiment, the instruction distribution module 312 generates and distributes the relevant management instructions to the OS instances 130 upon approval from an administrator. Alternatively, the instruction distribution module 312 may automatically distribute the instructions upon being generated without necessarily requiring an additional approval.

Figure 5:
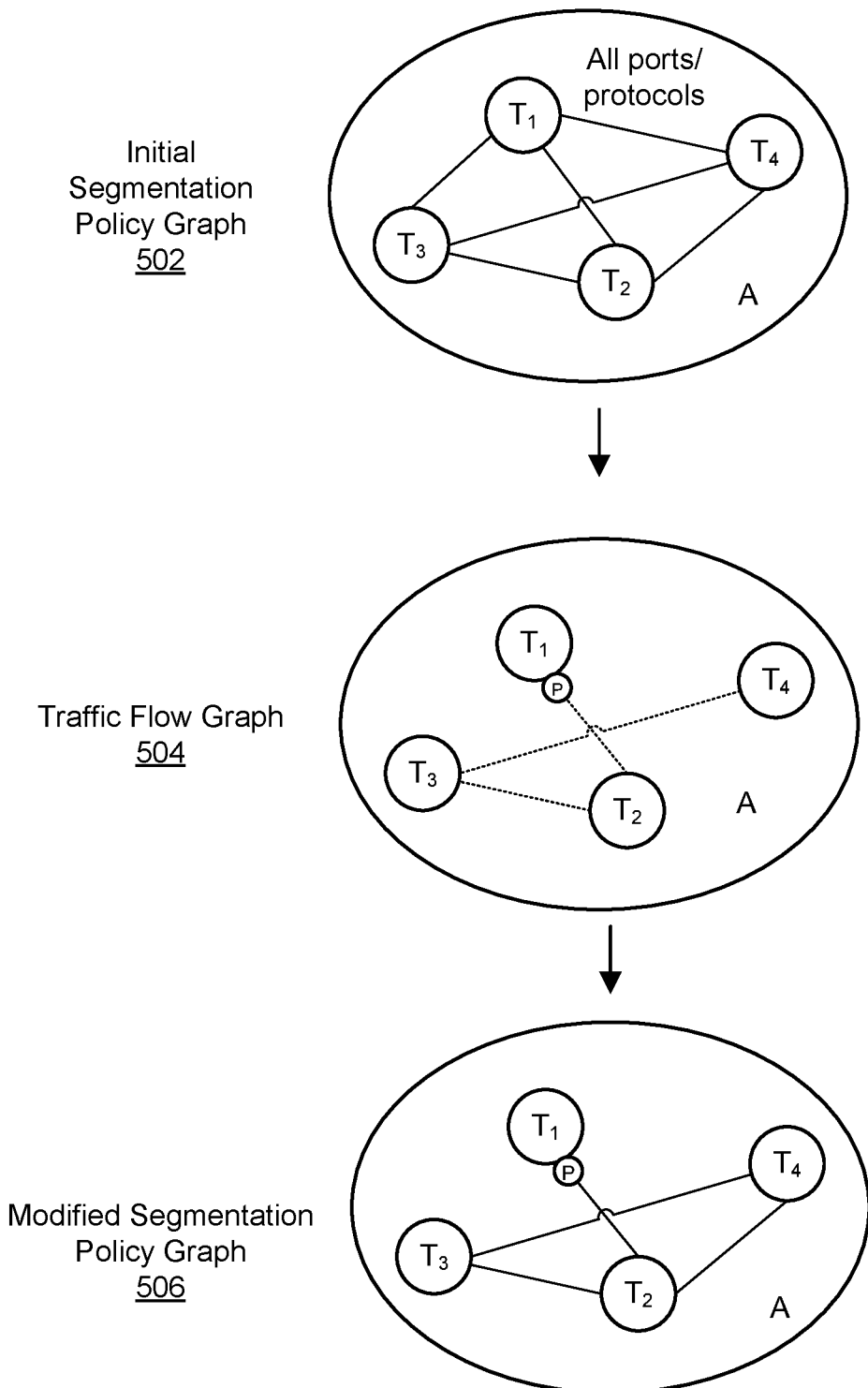
FIG. 5 is a diagram illustrating example graphs associated with a first technique for generating a modified segmentation policy to reduce exposure to vulnerabilities.

FIG. 5 illustrates a first example of a technique for modifying a segmentation strategy based on detected vulnerabilities. Here, an initial segmentation policy (as may be configured by an administrator according to the configuration setting) that would result from an initial segmentation strategy is represented by an initial segmentation policy graph 502. In this example, the initial segmentation policy graph 502 includes a rule that specifies that all workloads 138 in an application group A can communicate with each other over all ports and protocols (i.e., a group-level granularity segmentation strategy). A vulnerable port having a port number P is identified on at least one workload 138 in a tier $T_1$ in the application group A. The observed traffic flow graph 504 indicates that the workload in tier $T_1$ provides the service using the port number P to one or more workloads 138 only in tier $T_2$, but does not use the port number P in communications with workloads 138 in tiers $T_3$ or $T_4$. The segmentation strategy may be modified to generate a segmentation policy that only permits the workloads in the tier $T_1$ to provide the service using the port number P to workloads 138 in tier $T_2$, without permitting the workloads 138 in tier $T_1$ to provide the service using the port number P to workloads 138 in tiers $T_3$ or $T_4$. The modified segmentation strategy may generate a segmentation policy that retains rules permitting communications unaffected by the vulnerability (e.g., communications between tier $T_3$ and $T_4$). The modified segmentation policy is represented by a modified segmentation policy graph 506. Thus, in this example, the modified segmentation policy still permits the observed communication over the vulnerable port, but limits the workloads 138 to which the vulnerable port can connect, thereby reducing overall exposure of the administrative domain to the vulnerability.

Figure 6:
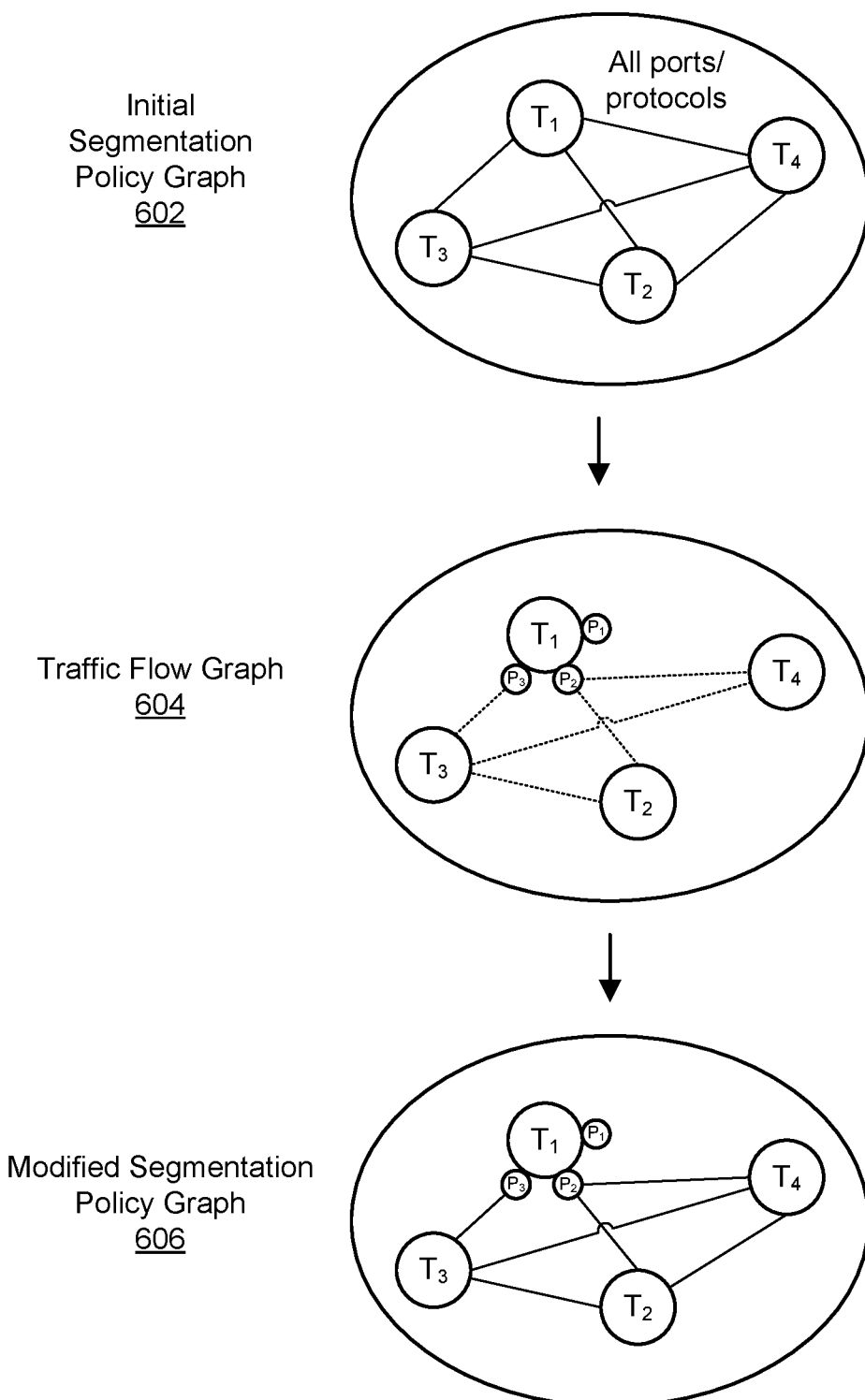
FIG. 6 is a diagram illustrating example graphs associated with a second technique for generating a modified segmentation policy to reduce exposure to vulnerabilities.

FIG. 6 illustrates a second example of a technique for modifying a segmentation strategy based on detected vulnerabilities. Here, an initial segmentation strategy (as may be configured by an administrator according to the configuration setting) that would result from an initial segmentation strategy is represented by an initial segmentation policy graph 602. In this example, the initial segmentation policy specifies that workloads 138 in an application group A can communicate with each other for all services (i.e., a group-level granularity segmentation strategy). A vulnerable port having a port number $P_1$ is identified on one or more workloads 138 in a tier $T_1$ in the application group A. In this case, the observed traffic flow graph 604 indicates that the workloads 138 in tier $T_1$ do not communicate to any tiers using the vulnerable port number $P_1$, but instead communicate using port number $P_2$ to workloads 138 in tiers $T_2$, $T_4$ and communicate using port number $P_3$ to workloads 138 in tier $T_3$. The initial segmentation strategy may be modified to generate a segmentation policy that permits workloads 138 in tier $T_1$ to communicate using only port numbers $P_2$ and $P_3$ consistent with the observed traffic flow graph, thus excluding traffic over the vulnerable port number $P_1$, which was not utilized in the traffic flow graph. Thus, as illustrated in the modified segmentation policy graph 606, the workloads 138 in tier $T_1$ are permitted to communicate using port number $P_3$ to workloads 138 in tier $T_3$ and may communicate using port number $P_2$ to workloads 138 in tiers $T_2$ and $T_3$. The modified segmentation policy may also still permit communications unaffected by the vulnerability (e.g., communications between tier $T_3$ and $T_4$) without modification. Thus, the modified segmentation policy still permits communications from tier $T_1$ to all workloads 138 in the application group A consistent with the original segmentation strategy, but limits the communications to utilizing the specific ports in the observed traffic flow graph, thereby reducing overall exposure of the administrative domain to the vulnerable port.

In an embodiment, an administrator interface may enable an administrator to select a segmentation strategy from a predefined set of segmentation strategies (e.g., port-level granularity, work-level granularity, or group-level granularity), and may also enable the administrator to toggle on or off the option to modify the strategy to reduce vulnerabilities. The administrator interface may present vulnerability information associated with the different possible segmentation strategies in order to enable the administrator to best assess the desired segmentation strategy for the administrative domain 150.

Figure 7:
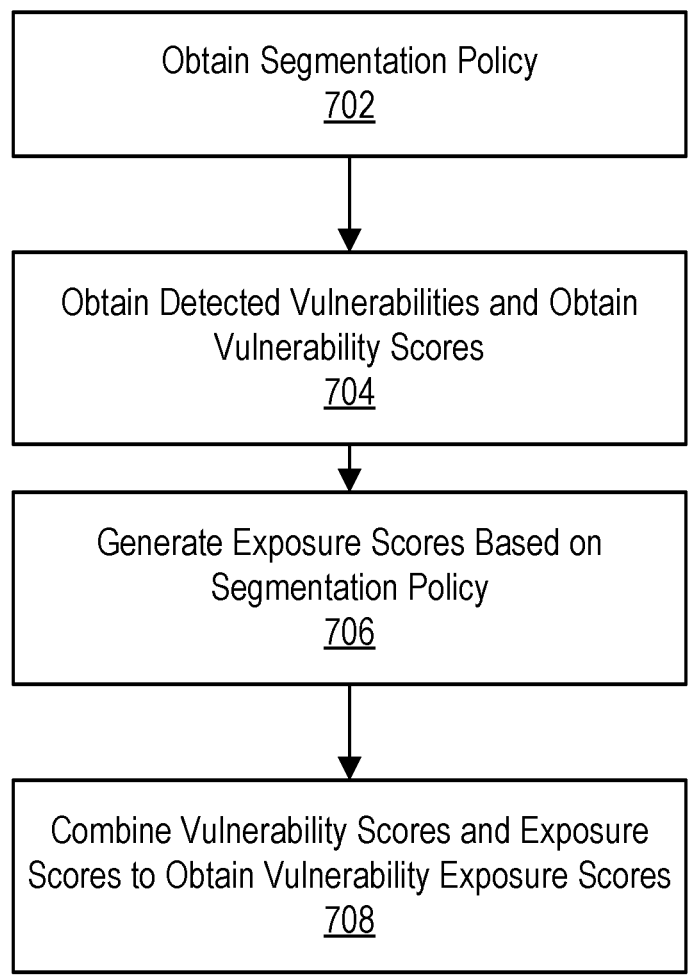
FIG. 7 is a flowchart illustrating an example process for generating vulnerability exposure scores associated with workloads in a segmented computing environment.

FIG. 7 is a flowchart illustrating an example embodiment of a process for generating vulnerability exposure scores associated with ports 134 on workloads 138 under a particular segmentation policy. The segmentation server 120 obtains 702 a segmentation policy. The segmentation server 120 furthermore obtains 704 detected vulnerabilities associated with ports 134 on the workloads 138 in the administrative domain 150 (e.g., by performing vulnerability scans on the workloads 138) and vulnerability scores associated with each of the detected vulnerabilities. The segmentation server 120 generates 706 exposure scores associated with each of the ports 134 based on the segmentation policy. The exposure scores represent a measure of permitted connectivity for the workloads 138 in the administrative domain 150 and may include one or more of total exposure scores, intra-group exposure scores associated with one or more groups, and inter-group exposure scores associated with one or more groups as described above. The segmentation server 120 combines 708 the respective vulnerability scores and respective exposure scores associated with the ports 134 to generate vulnerability exposure scores for each respective port 134. The vulnerability exposure scores may include one or more of total vulnerability exposure scores, intra-group vulnerability exposure scores associated with one or more groups, and inter-group vulnerability exposure scores associated with one or more groups as described above.

Figure 8:
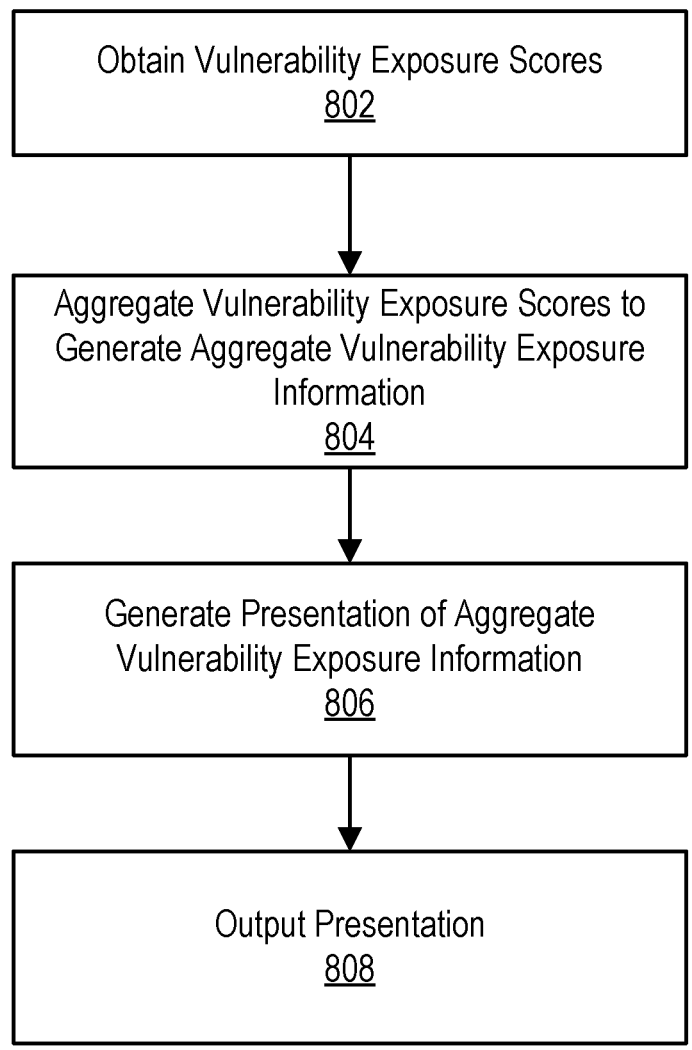
FIG. 8 is a flowchart illustrating an example process for generating a presentation of aggregate vulnerability exposure information associated with workloads in a segmented computing environment.

FIG. 8 is a flowchart illustrating an example embodiment of a process for aggregating vulnerability exposure scores to generate a presentation of vulnerability exposure information. The segmentation server 120 obtains 802 vulnerability exposure scores associated with each port 134 on workloads 138 operating in an administrative domain 150. The segmentation server 120 aggregates 804 the vulnerability exposure scores to generate aggregate vulnerability exposure information. Depending on configuration settings or user requests, the segmentation 120 may aggregate the vulnerability scores in different ways. For example, the segmentation server 120 may generate port number scores by combining vulnerability exposures scores associated with a particular port number for all workloads within 138 a tier or other predefined group. Furthermore, the segmentation server 120 may generate group level scores by combining vulnerability scores associated with all workloads 138 in a tier or other predefined group across all port numbers. The segmentation server 120 then generates 806 a presentation of the aggregate vulnerability exposure information (e.g., as illustrated in FIG. 4 described above). The segmentation server 120 outputs 808 the presentation (e.g., via a web interface) to enable an administrator to view and interact with the vulnerability exposure information.

Figure 9:
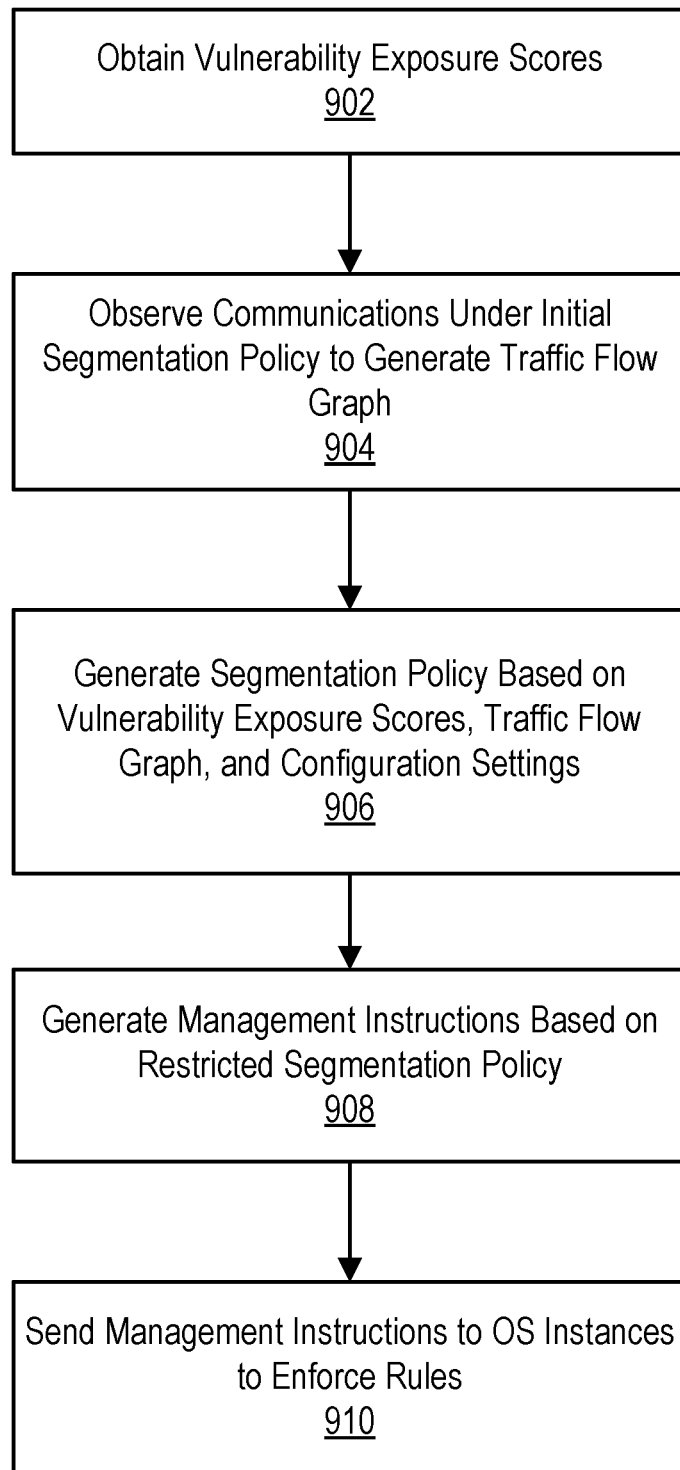
FIG. 9 is a flowchart illustrating an example process for generating rules for a segmentation policy based on vulnerabilities.

FIG. 9 is a flowchart illustrating an example embodiment of a process for generating a segmentation policy based on vulnerability exposure scores. The segmentation server 120 obtains 902 vulnerability exposure scores associated with each port 134 on workloads 138 within an administrative domain 150. The segmentation server 120 observes 904 communications between the workloads 138 under an initial segmentation policy to generate a traffic flow graph. In an embodiment, the initial segmentation policy applied while generating the traffic flow graph may permit all workloads 138 to communicate with any other workloads 138 on all ports. Alternatively, the initial segmentation policy may be more restrictive. The segmentation server 120 generates 906 a segmentation policy based on the vulnerability exposures, the traffic flow graph, and configuration settings. Here, the segmentation server 120 may generate a segmentation policy that generally conforms to the strategy specified in the configuration settings based on the observed traffic flow graph, but includes one or more changes to the rules that will reduce exposure associated with one or more vulnerabilities. For example, the segmentation server 120 may detect a vulnerable port on a workload in a first group of workloads (e.g., a first tier $T_1$). The segmentation server 120 may furthermore determine that the first group of workloads is connected to a second group of workloads (e.g., a second tier $T_2$) in the traffic flow graph, while determining that the first group of workloads is not connected to a third group of workloads (e.g., a third tier $T_3$) in the traffic flow graph using the vulnerable port even though such a connection would be permissible under an initial segmentation policy. In this case, the segmentation server 120 may generate a modified segmentation policy that permits the first group of workloads $T_1$ to communicate with the second group of workloads $T_2$ without permitting communication between the first group of workloads $T_1$ and the third group of workloads $T_3$. In another example, the segmentation server 120 may detect a vulnerable port on a workload in a first group of workloads $T_1$. Furthermore, the segmentation server 120 may detect a lack of connectivity using between the first group of workloads $T_1$ and the second group of workloads $T_2$ using the vulnerable port (although such a connection would be permissible under the initial segmentation policy), but instead detects connectivity using one or more non-vulnerable ports between the first group of workloads $T_1$ and the second group of workloads $T_2$. In this case, the segmentation server 120 may generate a modified segmentation policy that permits communications between the first group of workloads $T_1$ and the second group of workloads $T_2$ over the non-vulnerable ports used in the traffic flow graph without permitting communication over the vulnerable port that was not utilized in the traffic flow graph. The segmentation server 120 generates 908 management instructions based on the segmentation policy and sends 910 the management instructions to OS instances 130 to enforce the segmentation policy.

Beneficially, the above described techniques enable automatic generation and presentation of analytical data assessing vulnerabilities of workloads 138 in an administrative domain 150 and a measure of the exposure to those vulnerabilities associated with a particular segmentation policy. This enables an administrator to easily evaluate different segmentation strategies and assess the risks associated with them. Moreover, the segmentation server 120 can beneficially automatically generate a segmentation policy that is generally consistent with a desired segmentation strategy but is modified to reduce exposure to certain vulnerabilities without impeding operation of the workloads 138. Upon modified the segmentation policy, the vulnerability exposure scores may be recalculated and presented to enable an administrator to compare the effects of the different segmentation policies. Thus, the segmentation server 120 enables the workloads 150 in the administrative domain 150 to operate with improved security.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for generating vulnerability information relating to workloads executing on one or more processing devices in a segmented computing environment within an administrative domain, the method comprising:
   obtaining a current segmentation policy for the workloads executing on the one or more processing devices in the segmented computing environment, wherein the current segmentation policy comprises a set of label-based rules that indicate permitted connectivity among the workloads based on respective label sets associated with the workloads;
   identifying vulnerabilities associated with respective ports of the workloads;
   determining vulnerability scores based on each of the identified vulnerabilities for each of the respective ports;
   determining exposure scores for the respective ports, wherein an exposure score for a particular port represents a measure of exposure of the particular port to other workloads in the segmented computing environment based on the permitted connectivity under the rules of the current segmentation policy applicable to the particular port, and determining the exposure score for the particular port comprises:
      determining a count of a number of workloads in the segmented computing environment that can connect with the particular port under the current segmentation policy; and
      generating the exposure score for the particular port based in part on the determined count;
   combining the vulnerability scores with the respective exposure scores for the respective ports to generate vulnerability exposure scores for the respective ports, wherein the vulnerability exposure score of a particular port represents a measure of exposure to the vulnerabilities based on the permitted connectivity under the rules of the current segmentation policy applicable to the particular port;
   generating a presentation of vulnerability exposure information based on the vulnerability exposure scores; and
   outputting the presentation of the vulnerability exposure information.

2. The method of claim 1, wherein generating the presentation of the vulnerability exposure information comprises:
   aggregating, for workloads within a tier, the vulnerability exposure scores for each port number to generate port number scores for each port number; and
   generating a ranked list of port numbers based on the port number scores.

3. The method of claim 1, wherein generating the presentation of the vulnerability exposure information comprises:
   identifying tiers of workloads, each of the tiers comprising a group of workloads having common label values across two or more label dimensions;
   aggregating the vulnerability exposure scores across workloads in each of the tiers to generate tier-level scores for each of the tiers;
   generating a representation of a tier-level segmentation policy graph comprising nodes representing the tiers and edges representing connectivity between workloads in different ones of the tiers; and associating the tier-level scores with corresponding nodes in the tier-level segmentation policy graph.

4. The method of claim 1, wherein identifying the vulnerabilities comprises:
executing a vulnerability scanner to detect the vulnerabilities on each of the workloads.

5. The method of claim 1, wherein determining the exposure scores comprises:
identifying an external network permitted to connect to a particular port under the current segmentation policy;
obtaining a predefined score associated with the external network; and
generating an exposure score for the particular port based in part on the predefined score associated with the external network.

6. The method of claim 1, wherein determining the exposure scores comprises:
identifying an exposure score for a connecting port permitted to connect to a particular port under the current segmentation policy; and
generating the exposure score for the particular port based in part on the exposure score for the connecting port.

7. The method of claim 1, further comprising:
observing communications among the workloads under the current segmentation policy to generate a traffic flow graph;
generating a modified segmentation policy based on the vulnerability exposure scores, the traffic flow graph, and configuration settings, wherein the modified segmentation policy reduces exposure to the vulnerabilities relative to the current segmentation policy;
generating management instructions based on the modified segmentation policy to enforce the modified segmentation policy; and
sending the management instructions to operating system instances executing the workloads.

8. The method of claim 7, wherein generating the modified segmentation policy comprises:
detecting, in a first group of workloads, a vulnerable port on which one of the vulnerabilities exists;
detecting connectivity using the vulnerable port between the first group of workloads and a second group of workloads in the traffic flow graph;
detecting a lack of connectivity between the first group of workloads having the vulnerable port and a third group of workloads in the traffic flow graph;
generating the modified segmentation policy to limit permitted communications of the first group of workloads to the second group of workloads without permitting communications between the first group of workloads and the third group of workloads.

9. The method of claim 7, wherein generating the modified segmentation policy comprises:
detecting, in a first group of workloads, a vulnerable port on which one of the vulnerabilities exists;
detecting a lack of connectivity using the vulnerable port between the first group of workloads and a second group of workloads in the traffic flow graph;
detecting connectivity using one or more non-vulnerable ports between the first group of workloads and the second group of workloads in the traffic flow graph;
generating the modified segmentation policy to limit permitted communications between the first group of workloads and the second group of workloads to using the one or more non-vulnerable ports without permitting communications between the first group of workloads and the second group of workloads using the vulnerable port.

10. The method of claim 1, wherein generating the exposure scores comprises at least one of:
(a) generating an intra-group exposure score representing a measure of connectivity of the particular port to other workloads within a group associated with a workload of the particular port;
(b) generating an inter-group exposure score representing a measure of connectivity of the particular port to other workloads outside the group associated with a workload of the particular port; and
(c) generating a total exposure score representing a measure of connectivity of the particular port to any other workloads.

11. A non-transitory computer-readable storage medium storing instructions for generating vulnerability information relating to workloads executing on one or more processing devices in a segmented computing environment within an administrative domain, the instructions when executed by a processor causing the processor to perform steps including:
obtaining a current segmentation policy for the workloads executing on the one or more processing devices in the segmented computing environment, wherein the current segmentation policy comprises a set of label-based rules that indicate permitted connectivity among the workloads based on respective label sets associated with the workloads;
identifying vulnerabilities associated with respective ports of the workloads;
determining vulnerability scores based on each of the identified vulnerabilities for each of the respective ports;
determining exposure scores for the respective ports, wherein an exposure score for a particular port represents a measure of exposure of the particular port to other workloads in the segmented computing environment based on the permitted connectivity under the rules of the current segmentation policy applicable to the particular port, and determining the exposure score for the particular port comprises:
determining a count of a number of workloads in the segmented computing environment that can connect with the particular port under the current segmentation policy; and
generating the exposure score for the particular port based in part on the determined count;
combining the vulnerability scores with the respective exposure scores for the respective ports to generate vulnerability exposure scores for the respective ports, wherein the vulnerability exposure score of a particular port represents a measure of exposure to the vulnerabilities based on the permitted connectivity under the rules of the current segmentation policy applicable to the particular port;
generating a presentation of vulnerability exposure information based on the vulnerability exposure scores; and
outputting the presentation of the vulnerability exposure information.

12. The non-transitory computer-readable storage medium of claim 11, wherein generating the presentation of the vulnerability exposure information comprises:
aggregating, for workloads within a tier, the vulnerability-exposure scores for each port number to generate port number scores for each port number; and generating a ranked list of port numbers based on the port number scores.

13. The non-transitory computer-readable storage medium of claim 11, wherein generating the presentation of the vulnerability exposure information comprises:
   identifying tiers of workloads, each of the tiers comprising a group of workloads having common label values across two or more label dimensions;
   aggregating the vulnerability exposure scores across workloads in each of the tiers to generate tier-level scores for each of the tiers;
   generating a representation of a tier-level segmentation policy graph comprising nodes representing the tiers and edges representing connectivity between workloads in different ones of the tiers; and
   associating the tier-level scores with corresponding nodes in the tier-level segmentation policy graph.

14. The non-transitory computer-readable storage medium of claim 11, wherein determining the exposure scores comprises:
   identifying an external network permitted to connect to a particular port under the current segmentation policy;
   obtaining a predefined score associated with the external network; and
   generating an exposure score for the particular port based in part on the predefined score associated with the external network.

15. The non-transitory computer-readable storage medium of claim 11, further comprising:
   observing communications among the workloads under the current segmentation policy to generate a traffic flow graph;
   generating a modified segmentation policy based on the vulnerability exposure scores, the traffic flow graph, and configuration settings, wherein the modified segmentation policy reduces exposure to the vulnerabilities relative to the current segmentation policy;
   generating management instructions based on the modified segmentation policy to enforce the modified segmentation policy; and
   sending the management instructions to operating system instances executing the workloads.

16. A processing server for generating vulnerability information relating to workloads executing on one or more processing devices in a segmented computing environment within an administrative domain, the processing server comprising:
   one or more processors; and
   a non-transitory computer-readable storage medium storing instructions that when executed by the one or more processors cause the one or more processors to perform steps including:
      obtaining a current segmentation policy for the workloads executing on the one or more processing devices in the segmented computing environment, wherein the current segmentation policy comprises a set of label-based rules that indicate permitted connectivity among the workloads based on respective label sets associated with the workloads;
      identifying vulnerabilities associated with respective ports of the workloads;
      determining vulnerability scores based on each of the identified vulnerabilities for each of the respective ports;
      determining exposure scores for the respective ports, wherein an exposure score for a particular port represents a measure of exposure of the particular port to other workloads in the segmented computing environment based on the permitted connectivity under the rules of the current segmentation policy applicable to the particular port, and determining the exposure score for the particular port comprises:
         determining a count of a number of workloads in the segmented computing environment that can connect with the particular port under the current segmentation policy; and
         generating the exposure score for the particular port based in part on the determined count;
      combining the vulnerability scores with the respective exposure scores for the respective ports to generate vulnerability exposure scores for the respective ports, wherein the vulnerability exposure score of a particular port represents a measure of exposure to the vulnerabilities based on the permitted connectivity under the rules of the current segmentation policy applicable to the particular port;
      generating a presentation of vulnerability exposure information based on the vulnerability exposure scores; and
      outputting the presentation of the vulnerability exposure information.

17. The processing server of claim 16, wherein generating the presentation of the vulnerability exposure information comprises:
   aggregating, for workloads within a tier, the vulnerability-exposure scores for each port number to generate port number scores for each port number; and
   generating a ranked list of port numbers based on the port number scores.

18. The processing server of claim 16, wherein generating the presentation of the vulnerability exposure information comprises:
   identifying tiers of workloads, each of the tiers comprising a group of workloads having common label values across two ore label dimensions;
   aggregating the vulnerability exposure scores across workloads in each of the tiers to generate tier-level scores for each of the tiers;
   generating a representation of a tier-level segmentation policy graph comprising nodes representing the tiers and edges representing connectivity between workloads in different ones of the tiers; and
   associating the tier-level scores with corresponding nodes in the tier-level segmentation policy graph.

19. The processing server of claim 16, wherein determining the exposure scores comprises:
   identifying an external network permitted to connect to a particular port under the current segmentation policy;
   obtaining a predefined score associated with the external network; and
   generating an exposure score for the particular port based in part on the predefined score associated with the external network.

20. The processing server of claim 16, wherein determining the exposure scores comprises:
   identifying an exposure score for a connecting port permitted to connect to a particular port under the current segmentation policy; and
   generating the exposure score for the particular port based in part on the exposure score for the connecting port.

* * * * *